United States Patent [19]
Jansson

[11] Patent Number: 5,577,587
[45] Date of Patent: Nov. 26, 1996

[54] CENTRIFUGAL CLUTCH

[75] Inventor: Hans G. Jansson, Huskvarna, Sweden

[73] Assignee: Aktiebolaget Electrolux, Stockholm, Sweden

[21] Appl. No.: 337,747

[22] Filed: Nov. 14, 1994

[30] Foreign Application Priority Data

Nov. 26, 1993 [SE] Sweden ................................ 9303935

[51] Int. Cl.$^6$ .................................................. F16D 43/24
[52] U.S. Cl. .............................. 192/105 CD; 192/103 B; 188/184
[58] Field of Search ...................... 192/105 CD, 105 CE, 192/103 B, 104 B; 188/184

[56] References Cited

U.S. PATENT DOCUMENTS

| | | | |
|---|---|---|---|
| 4,226,312 | 10/1980 | Zindler | 192/105 CD X |
| 4,226,320 | 10/1980 | St. John . | |
| 4,282,962 | 8/1981 | St. John | 192/105 CD X |
| 4,294,342 | 10/1981 | St. John | 192/105 CD X |
| 4,296,852 | 10/1981 | Luerken | 192/105 CD X |
| 4,635,777 | 1/1987 | Nickel et al. | 192/105 CD X |
| 4,903,810 | 2/1990 | Stock et al. | 192/105 CD X |
| 4,947,977 | 8/1990 | Raymond | 192/105 CD X |
| 5,280,828 | 1/1994 | Reynoso et al. | 188/184 |

*Primary Examiner*—Andrea L. Pitts
*Attorney, Agent, or Firm*—Pearne, Gordon, McCoy & Granger

[57] ABSTRACT

A centrifugal clutch for a power driven working tool such as a chain saw, hedge trimmer, or the like having a hub portion (10) adapted to be connected to an engine shaft, and at least two clutch shoes (16, 17) rotatably journalled on the hub portion. The clutch shoes are adapted, when actuated by centrifugal forces, to move against the bias of tension springs striving to release or disengage the clutch shoes from the clutch drum, and engage a surrounding clutch drum (18). The tension springs (19, 20) have one end which is connected to a clutch shoe and another end which is connected to an adjacent clutch shoe such that a bearing free of play is insured between the clutch shoes and the hub portion.

3 Claims, 2 Drawing Sheets

CENTRIFUGAL CLUTCH

BACKGROUND OF THE INVENTION

The present invention relates to a centrifugal clutch for a power-driven implement, such as a motor saw, hedge trimmer or the like, having a hub portion adapted to be operatively connected to an engine shaft, and at least two clutch shoes rotatably journalled on the hub in order to, when actuated by centrifugal forces, engage a clutch drum radially surrounding the clutch shoes.

A centrifugal clutch for a power-driven saw is generally made so as to disengage the saw tool drive when the engine is running idle, and to engage the drive when the engine is running at a higher speed. To this end, means are typically provided to hold the clutch shoes in a retracted position at idling speed and, when the engine is running at a higher speed, to allow the shoes to be thrown radially outwardly toward the clutch drum in order to cause rotation thereof by means of frictional force.

SUMMARY OF THE INVENTION

The present invention provides a centrifugal clutch which has improved operational qualities and a lower noise level and, in addition, can be manufactured and assembled in a simple, economical, and rational manner.

In accordance with the present invention, the centrifugal clutch includes a pair of tension springs, one end of each spring being connected to a clutch shoe and the other end of each spring being connected to an adjacent clutch shoe. A resilient force provided by the tension spring insures a bearing free of play between the clutch shoes and a hub portion of the centrifugal clutch.

BRIEF DESCRIPTION OF THE DRAWINGS

The preferred embodiment of the present invention will be described in more detail hereafter with reference to the accompanying drawings, wherein.

DETAILED DESCRIPTION OF THE PREFERRED EMBODIMENT

Figure 1:
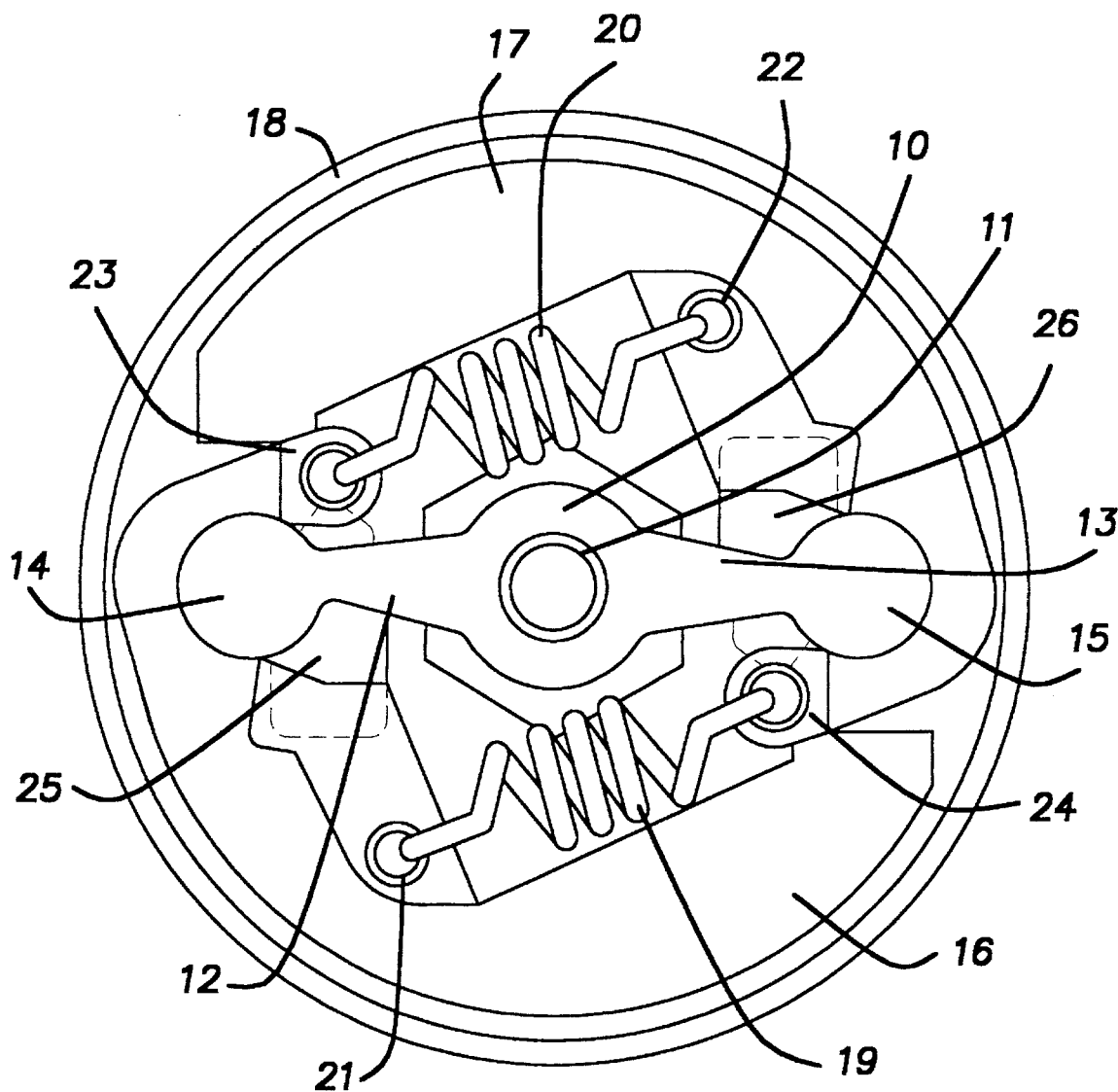
FIG. 1 is a plan view of the centrifugal clutch according to the present invention.

The centrifugal clutch shown in the drawings comprises a hub portion 10 adapted to be attached to an engine shaft (not shown) and, to this end, is provided with a central tapped bore 11. The hub portion has two opposite spokes 12, 13 provided with bearing pins 14 and 15, respectively, on which two clutch shoes 16, 17 are rotatably journalled. The clutch shoes 16, 17 have an arc-shaped outer surface conforming to the shape of a surrounding clutch drum 18. The shoes 16, 17 are held in a released or disengaged position, shown in FIGS. 1 and 2, by means of tension springs 19, 20. One end of each spring 19, 20 is attached to a bore 21, 22 in one of the respective clutch shoes 16, 17 spaced outwardly from the respective bearing pin 14, 15 in order to provide an appropriate lever. The other end of each spring 19, 20 is attached to a lug 24, 23, respectively, provided on the opposite clutch shoe 17, 16 adjacent to the respective bearing pin 15, 14.

Due to the illustrated connection of the springs 19, 20, the resilient force of the springs 19, 20 is applied to the end of the clutch shoes 16, 17 adjacent to the bearing pins 14, 15 and insures a bearing free of play between the clutch shoes 16, 17 and the hub portion 10. This results in a reduced wear of the bearing pins 14, 15 and a more distinct positioning of the axes of rotation of the clutch shoes 16, 17, which is advantageous for proper operation of the clutch. Additionally, the play-free bearing results in reduced noise production.

Figure 2:
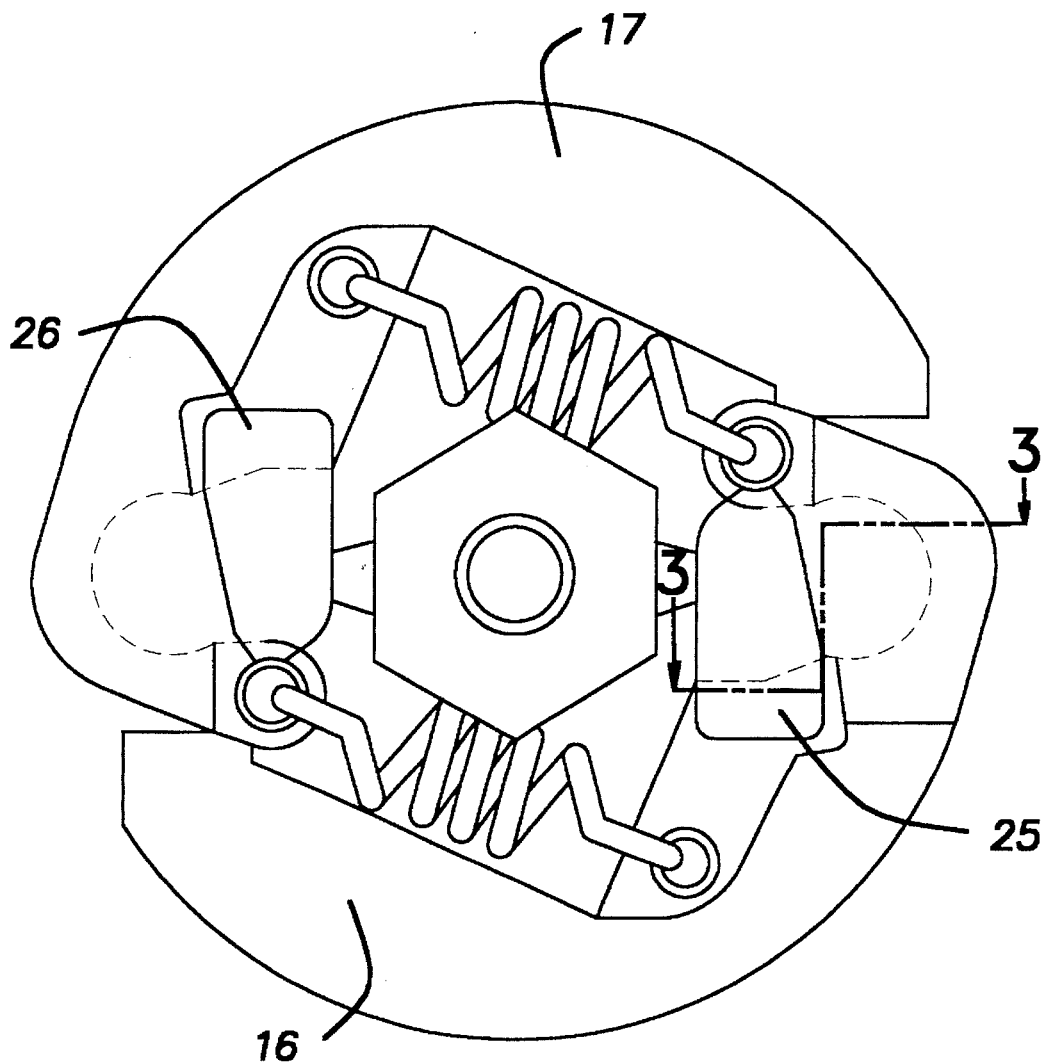
FIG. 2 is a corresponding view of the clutch as seen from the opposite side thereof and with the clutch drum removed; and, FIG. 3 is a sectional view along line III—III in FIG. 3.
Figure 3:
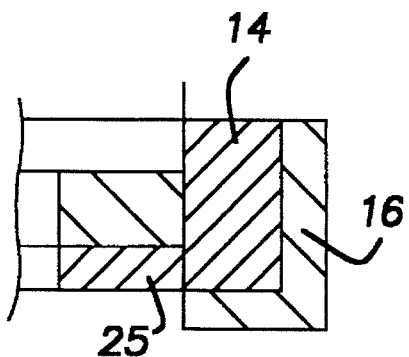

The hub portion 10 and the clutch shoes 16, 17 are axially fixed relative to one another by the bearing pins 14, 15. The hub portion 10 is also provided with radial projections 25, 26 that engage complementary supporting surfaces on the clutch shoes 16, 17, as illustrated in FIGS. 2 and 3. The projections 25, 26 and complementary supporting surfaces serve as a guide to axially interconnect the clutch shoes. Therefore, no separate locking means in the form of washers or the like are required to hold the clutch components in place during operation, thereby facilitating the assembly operation by reducing the number of components to be assembled and eliminating the risk of erroneous assembly. As such, the present invention provides a centrifugal clutch with increased operational reliability.

The hub portion 10 as well as the clutch shoes 16, 17 are adapted to be manufactured from sintered metal at low cost and with a minimum of subsequent treatment or machining.

Although the preferred embodiment is disclosed herein, it is clear that various modifications, rearrangements, and substitutions of parts may be employed without departing from the scope and spirit of the present invention as defined by the claims appended hereto.

What is claimed is:

1. A centrifugal clutch for a power-driven implement, comprising a hub portion (10) and a pair of clutch shoes (16, 17) rotatably journalled on said hub portion, each of said clutch shoes having a pivoted end adjacent said hub portion and a free end relatively remote from said hub portion resilient means bias said clutch shoes to a position disengaged from a clutch drum radially surrounding said clutch shoes, said clutch shoes, when actuated by centrifugal forces, overcome said bias and engage said clutch drum (18), wherein the resilient means comprises a pair of tension springs (19, 20), one end of each spring being connected to one of said pair of clutch shoes at said pivoted end and the other end of each spring being connected to the other of said pair of clutch shoes relatively between said free end and said hub portion such that a bearing free of play is insured between said shoes (16, 17) and said hub portion (10) by the resilient force provided by said tension springs.

2. A centrifugal clutch according to claim 1, wherein the hub portion (10) and the clutch shoes (16, 17) are axially interconnected by guide means (25, 26).

3. A centrifugal clutch according to claim 1, wherein the hub portion (10) has projections (25, 26) that engage complementary supporting surfaces provided on the clutch shoes (16, 17).

* * * * *